Figure 1:
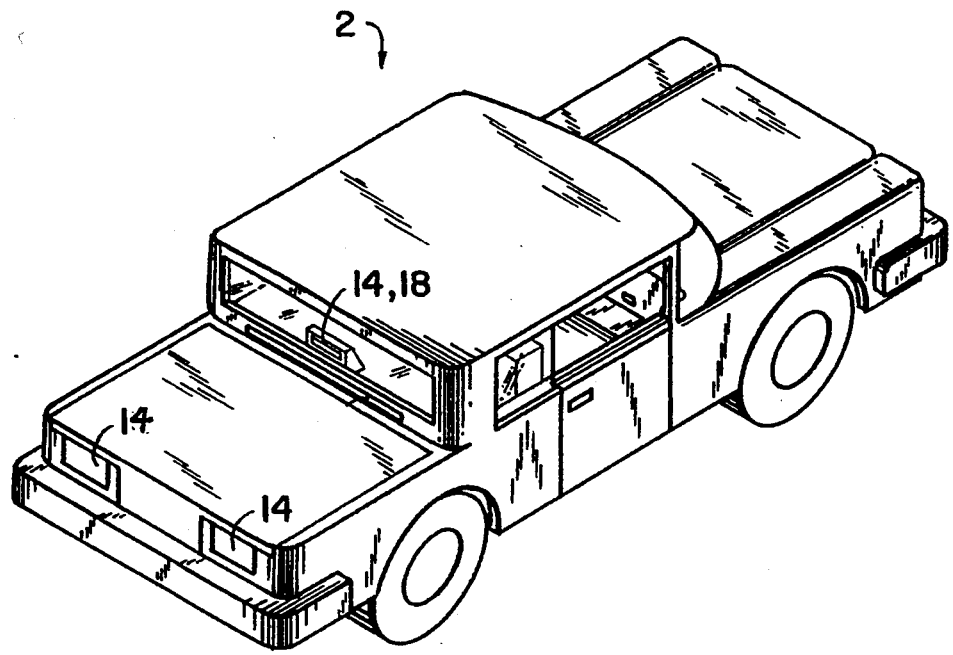

United States Patent
Gold

[11] Patent Number: 5,410,294
[45] Date of Patent: Apr. 25, 1995

[54] AUTO REAR WINDOW SIGNAL

[76] Inventor: Peter Gold, 389 Peninsula Blvd., Hempstead, N.Y. 11550

[21] Appl. No.: 181,295

[22] Filed: Jan. 13, 1994

[51] Int. Cl.⁶ .............................................. B60Q 1/00
[52] U.S. Cl. .................................... 340/464; 340/463; 340/466; 340/467
[58] Field of Search ............... 340/463, 464, 466, 467, 340/478, 479, 480, 482, 483, 485

[56] References Cited

U.S. PATENT DOCUMENTS

| | | | |
|---|---|---|---|
| 3,949,361 | 4/1976 | Replogle | 340/464 |
| 4,800,377 | 1/1989 | Slade | 340/467 |
| 4,952,909 | 8/1990 | Woerner et al. | 340/479 |
| 4,990,886 | 2/1991 | Stanulis | 340/479 |
| 5,058,698 | 10/1991 | Yoshida et al. | 180/179 |
| 5,164,701 | 11/1992 | Nan-Mu et al. | 340/464 |
| 5,166,681 | 11/1992 | Bottesch et al. | 340/436 |

*Primary Examiner*—John K. Peng
*Assistant Examiner*—Edward Lefkowitz

[57] ABSTRACT

Mandated by law in most states is an original equipment manufacture (OEM) auto rear window brake-operated light which displays itself as a steady light signal when the brake is operated. This same light is now given a flashing mode to indicate the "cruise control" is on so that an approaching motorist is encouraged to make a safe lane change rather than to "tailgate".

1 Claim, 1 Drawing Sheet

AUTO REAR WINDOW SIGNAL

The present invention relates generally to enhanced use of a presently equipped auto which significantly contributes to a safer operation thereof, the present equipment referred to being more particularly the third brake-operated rear light, now mandated by law in most states, and the enhancement thereof being to obviate "tailgating" with a significant attendant benefit to the safer operation of the auto.

EXAMPLE OF THE PRIOR ART

A current auto is typically equipped with "Cruise Control System for Automobile Vehicle" as illustrated and described in U.S. Pat. No. 5,058,698 issued to Yoshida et al. on Oct. 22, 1991. The "cruise control" operational mode when used as intended results in the auto travelling at a selected speed usually set just below the legal speed limit, thus avoiding a speeding violation. Neither in Yoshida or any other known prior patent is an approaching motorist made aware of the "cruise control" operation, and consequently there occurs two cars travelling at close proximity at a highway legal speed limit. When this occurs over a prolonged period, it qualifies as "tailgating" and is very dangerous. And typically this is what occurs because the motorist of the approached auto is reluctant to change out of "cruise control" and the approaching motorist is unaware of this reluctance, and does not respond to the situation with a safe lane change.

Broadly, it is an object of the present invention to provide an improved auto rear window light overcoming the foregoing and other shortcomings of the prior art. More particularly, it is an object to embody the rear window light, now standard so-called original equipment manufacture (OEM), with an operating mode to indicate "cruise control" operation, at no adverse effect on its providing its OEM function, to thus contribute to safer non-tailgating operation, all as will be better understood as the description proceeds.

The description of the invention which follows, together with the accompanying drawings, should not be construed as limiting the invention to the example shown and described, because those skilled in the art to which this invention appertains will be able to devise other forms thereof within the ambit of the appended claims.

Figure 2:
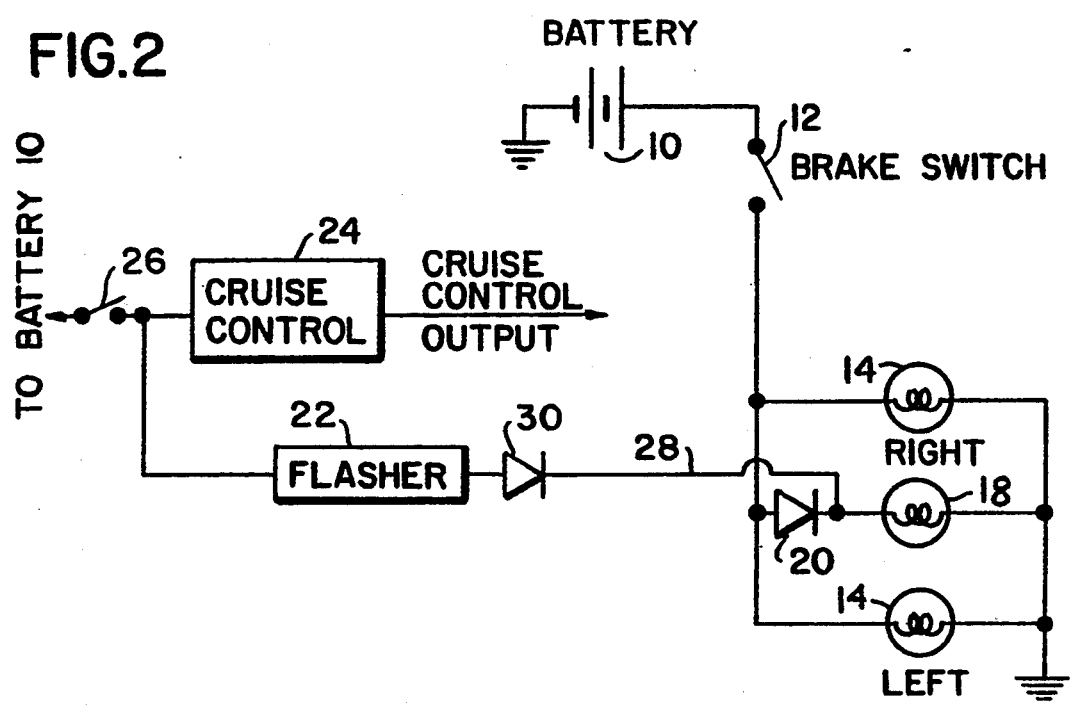

FIG. 1 is a perspective view of an auto with an improved rear window light signal according to the present invention; and FIG. 2 is a circuit diagram preferred for use in operating the light signal in the two modes contemplated by the invention.

Underlying the present invention is the recognition that "tailgating", a dangerous driving practice, is usually unintentional and can be significantly obviated by awareness communicated to the violator of the driving mode of the auto being approached. More particularly, the approached auto, herein generally designated 2, might typically be using a cruise control system of a type described and illustrated in U.S. Pat. No. 5,058,698 issued to Yoshida et al. on Oct. 22, 1991, which confines the operation of the auto 2 to a selected speed which will be assumed to be less than that of the approaching vehicle, and results in the autos travelling at possibly significant speeds in close proximity to each other. If this condition is only temporary, the danger is correspondingly nominal, but typically it is prolonged because the approached auto is on "cruise control" and the motorist is reluctant to modify this, and the approaching motorist is unaware of this reluctance. This misunderstanding of the two motorists thus qualifies as "tailgating" and is extremely dangerous on highways where autos are operated at the permitted legal speed limits.

It is accordingly proposed, in accordance with the present invention, that auto 2 which, as understood, has, in addition to rear left and right brake-operated taillights 14, also a rear window-displayed brake-operated third light designated 14, 18 as mandated by law in most states, and that said rear window light 14, 18 has two modes of operation to correspondingly obviate "tailgating" without interfering with normal operation of the auto. More particularly, the light 14, 18 which occupies a uniform interior location centrally along the bottom edge of the auto rear window, through driver education will be made known to motorists to have one operating mode, denoted as 14, which is a steady uninterrupted illumination occurring when taillights 14 are also illuminated, to indicate operation of the auto brake, and another operating mode, denoted as 18, which is a flashing interrupted illumination, to indicate use of "cruise control".

Thus, a motorist approaching a slower moving auto and noting the flashing operating mode 18 of light 14, 18 will be encouraged to make a lane change to obviate tailgating.

Although it should be readily understood how to embody the rear window light 14, 18 with the two previously described operating modes 14 and 18, for completeness' sake, a preferred circuit is illustrated in FIG. 2. Referring thereto, cruise control unit 24 is shown powered by the car's battery system 10, and provides an output to modulate the carburetor in a well understood manner, and typically this includes an on-off switch 26. In addition to allowing power to be applied to the cruise control unit, it now also is applied to flasher unit 22, which can be an electromechanical unit or an appropriate integrated circuit which provides an intermittent "flasher" output on line 28. Line 28 is coupled to the hot side of the rear brake light 14, 18. Thus, application of power to the cruise control unit will allow the light to flash in mode 18.

Since the rear light 14, 18 is connected in parallel with the rear brake lights 14, a blocking diode 20 is placed in series with the rear light leg, on the high or hot side of the connection from the flasher 22. Because the diode allows current flow only in one direction (from left to right in the diagram) the current supplied by the flasher 22 cannot reach the other tail-located brake lights 14. Thus, the rear window light is the only one which will flash. Normal operation of the brake lights 14 is not impaired, power from the battery 10 being applied to all the brake lights when brake switch 12 is engaged, as occurs when the brake pedal is depressed. Even if the rear window light is flashing, the constant power provided through the closed brake switch will allow the light to be continuously illuminated. A second blocking diode 30 in the flasher line isolates the flasher from the brake lights 14 when the brake switch 12 is closed, preventing power from the brake light line to backfeed the flasher output.

While the apparatus for practicing the within inventive method, as well as said method herein shown and disclosed in detail is fully capable of attaining the objects and providing the advantages hereinbefore stated, it is to be understood that it is merely illustrative of the presently preferred embodiment of the invention, and that no limitations are intended to the detail of construction or design herein shown other than as defined in the appended claims.

What is claimed is:

1. A safer method of operating an auto of type having first and second operating modes during driving operation thereof, of which a first operating mode is providing a visual display as a signal to an approaching motorist consisting of a light in a strategic display location centrally and along a bottom edge of a rear window of said auto, and of which a second operating mode is cruise-controlling the operation of said auto at a selected unchanging speed, said safer auto-operating method comprising the steps of electrically operating said strategically-located light optionally in a first steady mode and in a second flashing mode, operating said strategically-located light in said first steady mode coincident only with the operation of a brake of said auto, and operating said strategically-located light in said second flashing mode coincident only with the cruise-controlled operation of said auto, whereby a flashing light signal is provided to an approaching motorist during said cruise-controlled operation of said auto to provide a tailgate-averting instruction to said approaching motorist related to said unchanging speed of said auto.

* * * * *